US012040957B2

(12) United States Patent
Venkata et al.

(10) Patent No.: US 12,040,957 B2
(45) Date of Patent: *Jul. 16, 2024

(54) SYSTEMS AND METHODS FOR CONFIGURING AND DEPLOYING MULTI-ACCESS EDGE COMPUTING APPLICATIONS

(71) Applicant: Verizon Patent and Licensing Inc., Basking Ridge, NJ (US)

(72) Inventors: Sivanaga Ravi Kumar Chunduru Venkata, Irving, TX (US); Kirk Campbell, Long Valley, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/327,560

(22) Filed: Jun. 1, 2023

(65) Prior Publication Data

US 2023/0308367 A1 Sep. 28, 2023

Related U.S. Application Data

(63) Continuation of application No. 17/339,648, filed on Jun. 4, 2021, now Pat. No. 11,700,187.

(51) Int. Cl.
*H04L 41/0806* (2022.01)
*H04L 41/5009* (2022.01)
(Continued)

(52) U.S. Cl.
CPC ...... *H04L 41/5045* (2013.01); *H04L 41/5054* (2013.01); *H04W 4/50* (2018.02); *H04W 40/246* (2013.01); *H04L 41/16* (2013.01)

(58) Field of Classification Search
None
See application file for complete search history.

(56) References Cited

U.S. PATENT DOCUMENTS

| 10,440,096 | B2 | 10/2019 | Sabella et al. | |
| 10,785,652 | B1 * | 9/2020 | Ravindranath | H04W 12/48 |

(Continued)

FOREIGN PATENT DOCUMENTS

| EP | 3734453 A1 * | 11/2020 | G06F 1/206 |
| EP | 3798834 | 3/2021 | |
| WO | WO-2021062256 A1 * | 4/2021 | H04L 67/10 |

*Primary Examiner* — Ajit Patel

(57) ABSTRACT

A device may include a processor configured to determine a plurality of requirements for a Multi-Access Edge Computing (MEC) application requested by a customer; select a solution blueprint for the MEC application, from a set of solution blueprints, based on the determined plurality of requirements, wherein the solution blueprint includes an application deployment blueprint and a connectivity blueprint; and receive approval of the selected solution blueprint from the customer. The processor may be further configured to configure at least one transport network device based on the connectivity blueprint, in response to receiving the approval of the selected solution blueprint from the customer; and deploy at least one component of the MEC application on a MEC device in a MEC network based on the application deployment blueprint, in response to receiving the approval of the selected solution blueprint from the customer.

20 Claims, 7 Drawing Sheets

(51) Int. Cl.
*H04L 41/5041* (2022.01)
*H04L 41/5054* (2022.01)
*H04W 4/50* (2018.01)
*H04W 40/24* (2009.01)
*H04L 41/16* (2022.01)

(56) References Cited

U.S. PATENT DOCUMENTS

| | | |
|---|---|---|
| 11,496,550 B2 | 11/2022 | Liu et al. |
| 11,588,882 B2 | 2/2023 | Liu et al. |
| 2017/0048876 A1* | 2/2017 | Mahindra ............ H04L 12/407 |
| 2018/0027060 A1 | 1/2018 | Metsch et al. |
| 2019/0245789 A1* | 8/2019 | Sabella ................ H04M 15/93 |
| 2020/0007414 A1* | 1/2020 | Smith ................ H04L 41/5006 |
| 2020/0120446 A1* | 4/2020 | Stammers ............ H04W 4/029 |
| 2020/0145337 A1* | 5/2020 | Keating ............ H04L 47/2425 |
| 2020/0177683 A1 | 6/2020 | Zhao et al. |
| 2021/0250250 A1 | 8/2021 | Reznik |
| 2022/0038289 A1* | 2/2022 | Huang .................... G06F 16/27 |
| 2022/0232386 A1 | 7/2022 | Sehrawat et al. |

* cited by examiner

SYSTEMS AND METHODS FOR CONFIGURING AND DEPLOYING MULTI-ACCESS EDGE COMPUTING APPLICATIONS

CROSS-REFERENCE TO RELATED APPLICATIONS

This patent application is a continuation of U.S. patent application Ser. No. 17/339,648, filed on Jun. 4, 2021, and titled "SYSTEMS AND METHODS FOR CONFIGURING AND DEPLOYING MULTI-ACCESS EDGE COMPUTING APPLICATIONS," the disclosure of which is hereby incorporated by reference herein in its entirety.

BACKGROUND INFORMATION

To satisfy the needs and demands of users of mobile communication devices, providers of wireless communication services continue to improve and expand available services as well as networks used to deliver such services. One aspect of such improvements includes enabling mobile communication devices to access and use various services via the provider's communication network. The communications network may need to provide different types of services to a large number of diverse devices under various conditions. Managing a large number of different services under different conditions poses various challenges.

DETAILED DESCRIPTION OF PREFERRED EMBODIMENTS

Figure 1:
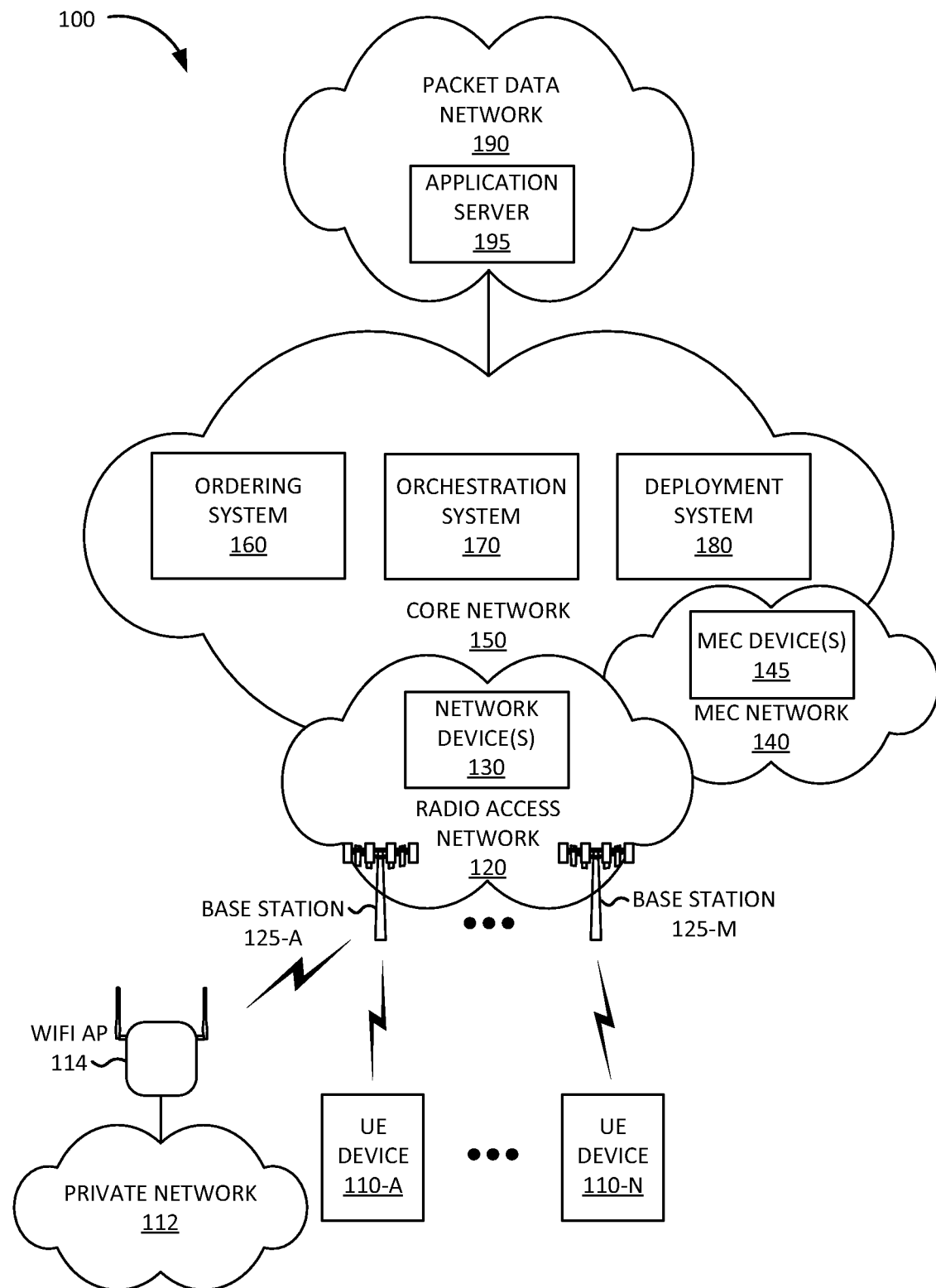
FIG. 1 illustrates an environment according to an implementation described herein.

The following detailed description refers to the accompanying drawings. The same reference numbers in different drawings identify the same or similar elements.

As communication networks and services increase in size, complexity, and number of users, management of the communication networks has become more complex. One way in which wireless networks are becoming more complicated is by incorporating various aspects of next generation networks, such as 5th generation (5G) mobile networks, utilizing high frequency bands (e.g., 24 Gigahertz, 39 GHz, etc.), and/or lower frequency bands such as Sub 6 GHz, and a large number of antennas. 5G New Radio (NR) radio access technology (RAT) provides significant improvements in bandwidth and/or latency over other wireless network technology. Additionally, a 5G core network supports and manages 5G radio access networks (RANs) that include base stations, providing various services and enabling connections to other networks (e.g., connections to the Internet, etc.). As an example, a 5G core network may provide support for enhanced Mobile Broadband (eMBB), ultra-reliable low latency communication (URLLC), massive Machine Type Communication (mMTC), and/or other types of communications.

Another enhancement to wireless communication services to reduce latency is the use of Multi-Access Edge Computing (MEC) architecture. The MEC architecture includes devices and associated connections located at the network edge relative to the point of attachment of a wireless user equipment (UE) device to a wireless communication network via a base station. Thus, the MEC network may be located in geographic proximity to the base station and be close to the base station from a network topology perspective. The devices in a MEC network may implement services previously implemented in a core network and/or a cloud computing center and enable processing to be offloaded from the core network and/or cloud computing center at a reduced latency.

In order to deploy an application in a MEC network, an application developer may need to upload application components to the MEC network, calculate the required resources for running the application, and reserve the required resources in the MEC network. Furthermore, deploying the application in the MEC network may require manually configuring a transport network to enable users to access the deployed application in the MEC network. Manually calculating and reserving resources in a MEC network, as well as manually configuring a transport network, may be cumbersome and time-consuming for developers of MEC applications.

Implementations described herein relate to systems and method for configuring and deploying MEC applications. An orchestration system may receive a request, from a customer (e.g., an app developer, an enterprise seeking to deploy an app for its employees or customers, etc.) via an ordering system, to configure and deploy a MEC application. The orchestration system may determine a set of requirements for the MEC application based on the request and select a solution blueprint for the MEC application from a set of solution blueprints based on the determined set of requirements. The solution blueprint may include an application blueprint and a connectivity blueprint. The application blueprint may specify the deployment of the MEC application and the connectivity blueprint may specify configuration of the transport network to enable UE devices to access the MEC application.

In some implementations, selecting the solution blueprint for the MEC application may include using a machine learning model to select the solution blueprint from a set of solution blueprints or using a generative machine learning model to generate the solution blueprint based on the determined requirements.

The orchestration system may provide the selected solution blueprint to the customer (e.g., app. developer, enterprise associated with a set of UE devices for its employees and/or customers, etc.), receive modifications for the selected solution blueprint from the customer, modify the selected solution blueprint based on the received modification, and receive approval of the modified solution blueprint from the customer. In response to receiving approval from the customer, the orchestration system may implement the solution blueprint by deploying components of the MEC application on one or more MEC devices in a MEC network based on the deployment blueprint. Furthermore, the orchestration system may configure transport network devices in a communication path between UE devices associated with the customer and the MEC network on which the MEC application is deployed.

Determining the set of requirements for the MEC application may include receiving a description (e.g., in a document, etc.) of the MEC application requirements from the customer, performing keyword extraction on the received description to identify a set of keywords, and mapping the set of keywords to a set of requirements. In some implementations, the mapping may be performed using a machine learning model trained to map keywords to requirements associated with MEC applications. If the orchestration system detects that a particular requirement is not specified for the MEC application requested by the customer, the orchestration system may select a default value for the particular requirement in response.

The set of requirements may include, for example, a performance requirement associated with the MEC application, a capacity requirement associated with the MEC application, a location associated with the MEC application, a user type associated with the MEC application, a security requirement associated with the MEC application, an availability requirement associated with the MEC application, an elasticity requirement associated with the MEC application (e.g., whether the deployment is to be continuous or active during particular time periods, etc.), a bandwidth requirement associated with the MEC application, an application type associated with the MEC application, and/or another type of requirement that may be specified for a MEC application deployment.

The connectivity blueprint may include, for example, information identifying a connection type for a connection to access the MEC application, a transport network device for the connection, reserved processing resources of a transport network device associated with the connection, a network path for the connection, a redundancy path for the connection, a reserved bandwidth for the connection, a firewall rule associated with the connection, key performance indicators (KPIs) measured for the connection, a network slice associated with the connection, and/or other types of configuration information for enabling UE devices to communicate with a MEC application.

The application deployment blueprint may include, for example, information identifying a network function deployment type for the application deployment, a deployment location for the application deployment, processing resources reserved for the application deployment, storage resources reserved for the application deployment, a set of microservices to be deployed for the application deployment, KPIs to be measured for the application deployment, and/or other types of deployment information for deploying a MEC application.

FIG. 1 is a diagram of an exemplary environment 100 in which the systems and/or methods, described herein, may be implemented. As shown in FIG. 1, environment 100 may include UE devices 110-A to 110-N (referred to herein collectively as "UE devices 110" and individually as "UE device 110"), a private network 112 that includes a WiFi Access Point (AP) 114, a radio access network (RAN) 120 that includes base stations 125-A to 125-M (referred to herein collectively as "base stations 125" and individually as "base station 125") and network device(s) 130, MEC network(s) 140 that include MEC device(s) 145, core network 150 that includes an ordering system 160, an orchestration system 170, a deployment system 180, and a packet data networks (PDN) 190 that includes an application server 195.

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface.

In some implementations, UE device 110 may communicate using machine-to-machine (M2M) communication, such as MTC, and/or another type of M2M communication for Internet of Things (IoT) applications. For example, UE device 110 may include a health monitoring device, an asset tracking device, a traffic management device, a climate controlling device, a device controlling an electronic sign, a device controlling a manufacturing system, a device controlling a security system, a device controlling a power system, a device controlling a financial transaction system, and/or another type of electronic device.

Private network 112 may include a wireless local area network (WLAN) serviced by WiFi AP 114 and associated with a customer. For example, private network 112 may be associated with an office building, manufacturing site, business location, etc. and UE device 110 may connect to core network 150 via private network 112 and WiFi AP 114. WiFi AP 114 may include a device with a transceiver configured to communicate with UE devices 110 using WiFi signals based on the Institute of Electrical and Electronics Engineers (IEEE) 802.11 standards for implementing a WLAN network. WiFi AP 114 may include a cellular wireless modem and may attach to base station 125. WiFi AP 114 may establish a connection to core network 150 via RAN 120. In some implementations, WiFi AP 114 may be managed by the provider of communication services that manages RAN 120 and/or core network 150 and may be configured as part of a connectivity blueprint associated with a MEC application.

RAN 120 may enable UE devices 110 to connect to core network 150 via base stations 125 using cellular wireless signals. For example, RAN 120 may include one or more central units (CUs) and distributed units (DUs) (not shown in FIG. 1) that enable and manage connections from base stations 125 to core network 150. RAN 120 may include features associated with an LTE Advanced (LTE-A) network, a 5G core network and/or other advanced network. The features may include, for example, management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; Machine Type Communication (MTC) functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Base station 125 may include a 5G NR base station (e.g., a gNodeB) and/or a Fourth Generation (4G) Long Term Evolution (LTE) base station (e.g., an eNodeB). Each base station 125 may include devices and/or components configured to enable cellular wireless communication with UE devices 110. For example, base station 125 may include a radio frequency (RF) transceiver configured to communicate with UE devices using a 5G NR air interface using a 5G NR protocol stack, a 4G LTE air interface using a 4G LTE protocol stack, and/or using another type of cellular air interface. Base station 125 may enable communication with core network 150 to enable core network 150 to authenticate UE device 110 with a subscriber management device (e.g., Home Subscriber Server (HSS) in 4G, Unified Data Management (UDM) in 5G, etc.).

RAN 120 may include network device(s) 130. Network device 130 may include a transport network device that provides connectivity from base station 125 to MEC network 140 and/or core network 150. Network device 130 may include, for example, a switch, router, firewall, gateway, an optical switching device (e.g., a reconfigurable optical add-drop multiplexer, etc.), and/or another type of network device. Network device 130 may include a physical network device with specialized hardware or a virtual network function (VNF) device implemented on top of a common shared physical infrastructure using Software Defined Networking (SDN). For example, an SDN controller (e.g., in orchestration system 170, in deployment system 180, etc.) may implement the functions of a transport network device using a VNF virtual machine, a Cloud-Native Network Function (CNF) container, an event driven serverless architecture interface, and/or another type of SDN architecture.

Each MEC network 140 may be associated with one or more base stations 125 and may provide MEC services for UE devices 110 attached to the base stations 125. MEC network 140 may be in proximity to base stations 125 from a geographic and network topology perspective, thus enabling low latency communication with UE devices 110 and/or base stations 125. As an example, MEC network 140 may be located on a same site as one of the one or more base stations 125. As another example, MEC network 140 may be geographically closer to the one or more base stations 125, and reachable via fewer network hops and/or fewer switches, than other base stations 125. As yet another example, MEC network 140 may be reached without having to go through a gateway device, such as a 4G Packet Data Network Gateway (PGW) or a 5G User Plane Function (UPF).

MEC network 140 may include one or more MEC devices 145. MEC devices 145 may provide MEC services to UE devices 110, such as, for example, content delivery of streaming audio and/or video, cloud computing services, gaming, authentication services, etc. MEC device 145 may be used to deploy a MEC application for a customer based on an application deployment blueprint selected for the MEC application. The MEC application may be deployed using a virtual machine, containers sharing a common operating system (OS), an event driven serverless architecture interface, and/or another type of deployment technique.

Core network 150 may be managed by a provider of cellular wireless communication services and may manage communication sessions of subscribers connecting to core network 150 via RAN 120. For example, core network 150 may establish an Internet Protocol (IP) connection between UE devices 110 and other networks, such as PDN 190. In some implementations, core network 150 may include a 5G core network. In other implementations, core network 150 may include a 4G LTE core network (e.g., an evolved packet core (EPC) network).

Ordering system 160 may include one or more computer devices, such as server devices, to process orders for MEC applications. For example, a customer, such as a business, organization, government entity, etc. may request deployment of a MEC application. As an example, a business customer may request a messaging service with filtering rules and a low latency requirement to be implemented in MEC network 140. Ordering system 160 may provide a user interface for the business customer to provide a description of the requirements for the messaging service application. Furthermore, ordering system 160 may include a catalog of available MEC applications for deployment and/or available microservices that may be selected by the customer to build a MEC application. For example, a messaging application may be deployed using a messaging microservice to route messages, a security microservice to monitor messages for security threats, and a reporting microservice for reporting KPIs associated with the messaging application. Ordering system 160 may provide a customer order, which includes a description of the requested requirements for the MEC application, to orchestration system 170.

Orchestration system 170 may include one or more computer devices, such as server devices, to orchestrate deployment of a MEC application in MEC network 140 and/or to configure a transport network in RAN 120 and/or private network 112 to manage traffic associated with the MEC application. Orchestration system 170 may select or generate a solution blueprint based on a customer order received from ordering system 160 and may orchestrate deployment of the MEC application based on the solution blueprint. For example, orchestration system 170 may instruct deployment system 180 to deploy the MEC application based on the solution blueprint. In some implementations, orchestration system 170 may configure the transport network devices based on the solution blueprint. In other implementations, orchestration system 170 may instruct deployment system 180 to perform the configuration of the transport network devices.

Deployment system 180 may include one or more computer devices, such as server devices, to deploy MEC applications in MEC network 140. For example, deployment system 180 may include a container orchestration platform to configure and automate container deployment, scaling, and/or management. For example, the container orchestration platform may deploy a MEC application as a set of microservices, with each microservice deployed in a different container, may deploy additional instances of a microservice based on increased load, and/or may manage the deployed instances across different physical devices, herein also referred to as nodes. Furthermore, deployment system 180 may manage communication between different microservices using a service mesh. The container orchestration platform may organize containers into groups called pods and the service mesh may deploy a service proxy in the same pod as a microservice container to enable the microservice to communicate with other microservices.

PDN 190 may include a packet data network. PDN 190 may be associated with an Access Point Name (APN) and UE device 110 may request a connection to PDN 190 using the APN. PDN 190 may include, and/or be connected to and enable communication with, a local area network (LAN), a wide area network (WAN), a metropolitan area network (MAN), an autonomous system (AS) on the Internet, an optical network, a cable television network, a satellite network, an ad hoc network, an intranet, or a combination of networks. PDN 190 may include application server 195. Application server 195 may be associated with a customer seeking to deploy a MEC application in MEC network 140. The MEC application may include an application running on application server 195 and some or all of the functionality of the application may be transferred to the MEC application deployed in MEC network 140. For example, an application deployment blueprint may specify which functionality of the application running on application server 195 is to be transferred to MEC network 140 and/or which types UE device 110 traffic associated with the application is to be routed to MEC network 140.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100. As an example, while ordering system 160, orchestration system 170, and/or deployment system 180 are shown as separate systems in FIG. 1, in other implementations, orchestration system 170 may include and/or be combined with ordering system 160 and/or deployment system 180.

Figure 2:
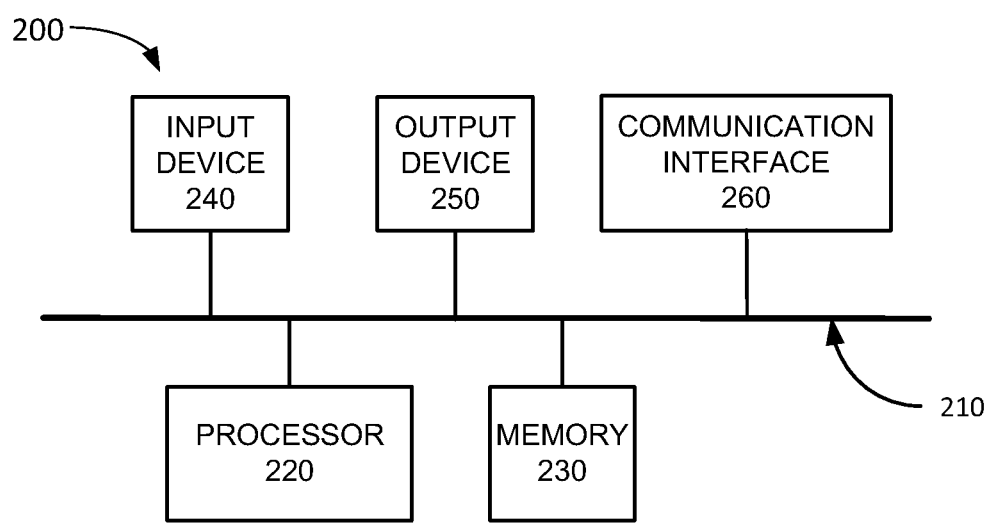
FIG. 2 is a diagram illustrating exemplary components of a device that may be included in an environment according to an implementation described herein.

FIG. 2 illustrates example components of a device 200 according to an implementation described herein. UE device 110, WiFi AP 114, base station 125, network device 130, MEC device 145, ordering system 160, orchestration system 170, deployment system 180, and/or application server 195 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to one or more antennas/antenna arrays for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to selecting and implementing a solution blueprint for deploying a MEC application. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
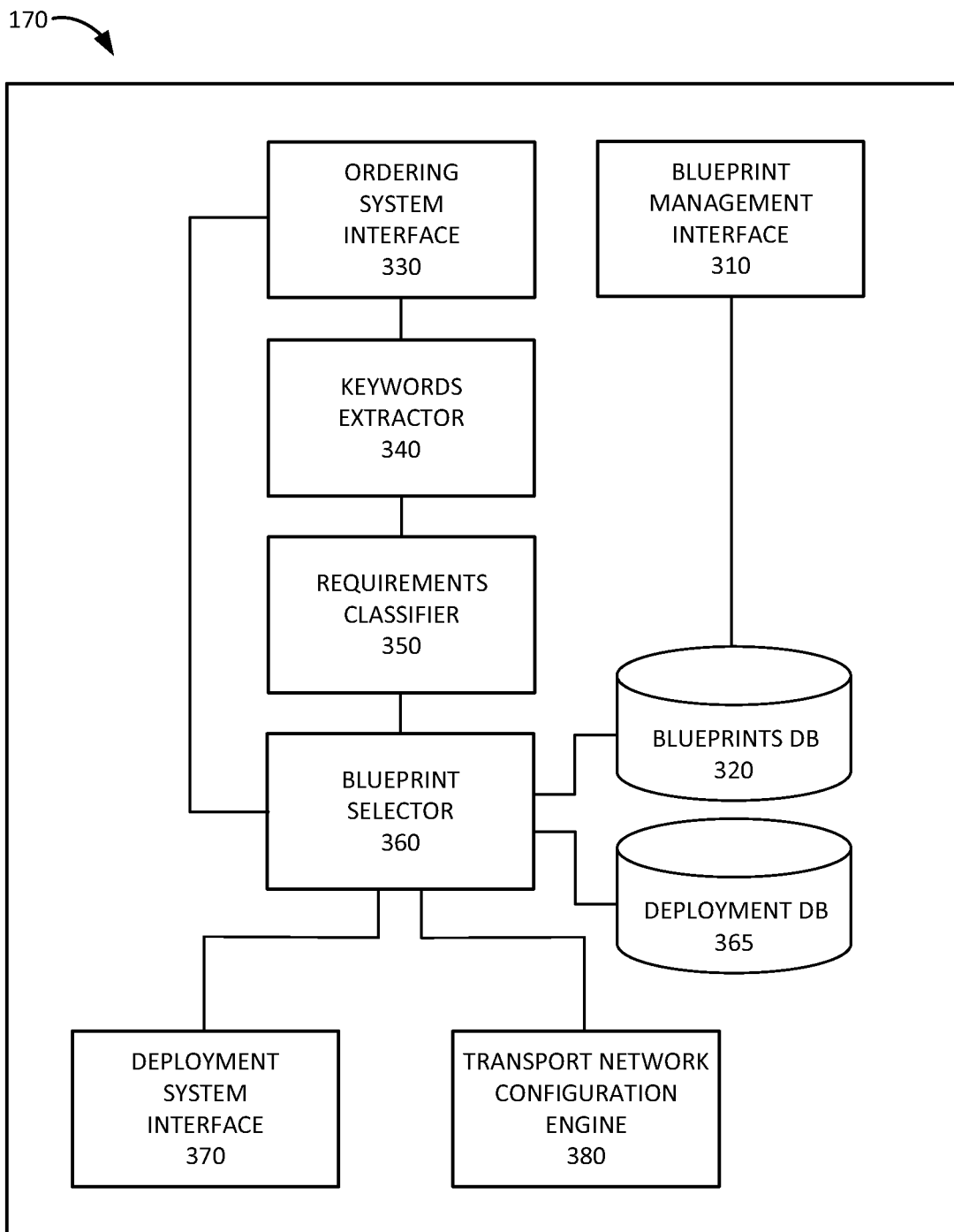
FIG. 3 is a diagram illustrating exemplary components of an orchestration system according to an implementation described herein.

FIG. 3 is a diagram illustrating exemplary components of orchestration system 170. The components of orchestration system 170 may be implemented, for example, via processor 220 executing instructions from memory 230. Alternatively, some or all of the components of orchestration system 170 may be implemented via hard-wired circuitry. As shown in FIG. 3, orchestration system 170 may include a blueprint management interface 310, a blueprint database (DB) 320, an ordering system interface 330, a keywords extractor 340, a requirements classifier 350, a blueprint selector 360, a deployment DB 365, a deployment system interface 370, and a transport network configuration engine 380.

Blueprint management interface 310 may enable an administrator to manage solution blueprints stored in blueprint DB 320. For example, blueprint management interface 310 may include a user interface to create, read, update, and/or delete solution blueprints. Blueprint DB 320 may store solution blueprints for deploying MEC applications. Exemplary information that may be stored in blueprint DB 320 is described below with reference to FIG. 5.

Ordering system interface 330 may receive order information from ordering system 160. For example, ordering system interface 330 may receive requests to deploy MEC application from customers. A request to deploy a MEC application may include a description that includes a set of requirements for the MEC application. Ordering system interface 330 may provide the description to keywords extractor 340.

Keywords extractor 340 may perform keyword extraction to identify a set of keywords to be mapped to a set of requirements associated with the deployment of a MEC application. For example, keywords extractor 340 may compare the content of a document that includes a description of the requirements for the deployment of the MEC application against a library of designated keywords and/or regular expressions to identify keywords that may be used to identify particular requirements. In other implementations, keywords extractor 340 may use a machine learning model that uses unsupervised learning to identify relevant keywords in the received description.

Requirements classifier 350 may map a set of keywords to a set of requirements for deploying a MEC application. In some implementations, requirements classifier 350 may map a set of keywords to the set of requirements based on a mapping table. In other implementations, requirements classifier 350 may use a machine learning classifier to map the set of keywords to the set of requirements.

The term "machine learning," as used herein, may refer to a process performed without requiring user interaction, by using a trained classifier model to make a decision, a prediction, and/or an inference. A machine learning process may refer to a process of training the classifier using supervised learning (e.g., a labeled data set), unsupervised learning (e.g., an unlabeled data set), reinforcement learning, and/or another type of learning methodology, and/or using the trained classifier to arrive at the decision, prediction, and/or inference using a particular data set, and/or updating or refining a trained classifier using the particular data set.

A trained machine learning model or classifier may include, for example, one or more of a support vector machines (SVM) model, a gradient boosting model, a random forest model, a decision tree model, a naïve Bayes classifier model, a K-nearest neighbors (KNN) classifier model, a maximum entropy classifier model, a kernel density estimation classifier model, a deep learning neural network (DNN) model (e.g., a recurrent neural network (RNN) model, such as a Long Term Short Memory (LSTM) neural network model, an attention mechanism neural network model, a Gated Recurrent Units (GRU) neural network model, an independently recurrent neural network (In-dRNN) neural network model, a Neural Turing Machine (NTM) model, etc.), a Self-Organizing Map (SOM) model, and/or another type of machine learning model.

Blueprint selector 360 may select a solution blueprint for deploying a MEC application based on a determined set of requirements. In some implementations, blueprint selector 360 may map a set of requirements to a solution blueprint using a mapping table. In other implementations, blueprint selector 360 may map the set of requirements to the solution blueprint using a trained machine learning model. An exemplary machine learning model to select a solution blueprint is described below with reference to FIG. 4.

Furthermore, blueprint selector 360 may provide the selected solution blueprint to the customer via a user interface, or via ordering system 160. The customer may populate fields in the solution blueprint with particular data (e.g., by specifying locations, networks, network devices, UE devices 110 allowed to access the MEC application, application and/or microservice images to be used to deploy application or microservice instances, etc.) that may be used to deploy the MEC application. Furthermore, the customer may make modifications to the selected solution blueprint before approving the selected solution blueprint. After receiving the approval from the customer, blueprint selector 360 may store deployment information in deployment DB 365 and use the solution blueprint to orchestrate the deployment of the MEC application.

Deployment system interface 370 may be configured to communicate with deployment system 180. For example, deployment system interface 370 may instruct deployment system 180 to deploy a MEC application in MEC network 140 based on a solution blueprint. Transport network configuration engine 380 may configure transport network elements (e.g., network devices 130, WiFi AP 114, etc.) along a communication path between UE devices 110 that are to use the MEC application and MEC device 145 hosting the MEC application.

Although FIG. 3 shows exemplary components of orchestration system 170, in other implementations, orchestration system 170 may include fewer components, different components, additional components, or differently arranged components than depicted in FIG. 3. Additionally, or alternatively, one or more components of orchestration system 170 may perform one or more tasks described as being performed by one or more other components of orchestration system 170.

Figure 4:
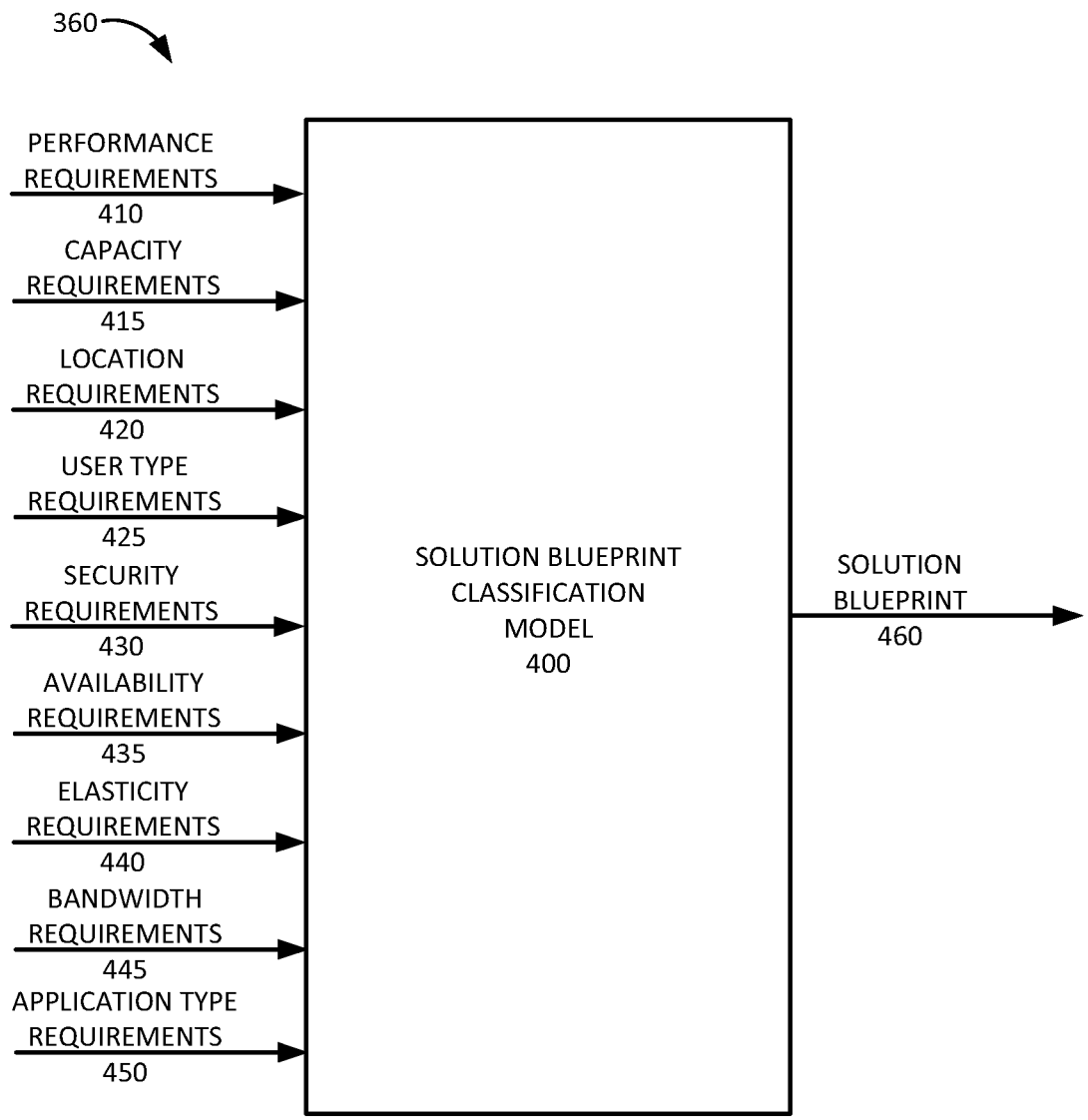
FIG. 4 is a diagram illustrating exemplary components of the requirements classifier of FIG. 3 according to an implementation described herein.

FIG. 4 is a diagram illustrating exemplary components of a solution blueprint classification model 400 that may be included in blueprint selector 360. The components of solution blueprint classification model 400 may be implemented, for example, via processor 220 executing instructions from memory 230. Alternatively, some or all of the components of solution blueprint classification model 400 may be implemented via hard-wired circuitry. As shown in FIG. 4, solution blueprint classification model 400 may include a set of inputs and a solution blueprint output 460. The set of inputs may include performance requirements 410, capacity requirements 415, location requirements 420, user type requirements 425, security requirements 430, availability requirements 435, elasticity requirements 440, bandwidth requirements 445, and application type requirements 450.

Performance requirements 410 may include performance requirements for the MEC application, such as, for example, a latency requirement, a packet delivery rate requirement, a packet delay variation requirement, an error rate requirement, and/or another type of performance requirement associated with the MEC application.

Capacity requirements 415 may include capacity requirements for the MEC application, such as, for example, a processing capacity requirement, a memory capacity requirement, a storage capacity requirement, a number of active sessions requirement, and/or another type of capacity requirement associated with the MEC application.

Location requirements 420 may include location requirements for the MEC application, such as, for example, a set of geographic locations at which the MEC application is to be deployed, the number of locations at which the MEC application is to be deployed, the types of location at which the MEC application is to be deployed, and/or another types of location requirement associated with the MEC application. User type requirements 425 may include user type requirements for the MEC application, such as, for example, whether UE devices 110 using the MEC application are stationary or mobile (e.g., moving between base stations 125 associated with different MEC networks 140), whether UE devices 110 using the MEC application are associated with human users or correspond to MTC devices, a total number of UE devices 110 expected to use the MEC application, an average number of UE devices 110 expected to use the MEC application during a particular time period, and/or another types of user type requirement associated with the MEC application.

Security requirements 430 may include security requirements for the MEC application, such as, for example, a security level for the MEC application (e.g., high, medium, low, etc.), a type of encryption required for the MEC application, a type of authentication required by UE devices 110 to use the MEC application, a type of security procedure required for the MEC application (e.g., a deep packet inspection, a whitelist of users allowed to use the MEC application, etc.), and/or another type of security requirement for the MEC application.

Availability requirements 435 may include an availability requirement for the MEC application, such as, for example, a guaranteed percentage of time that the MEC application is available, types of events during which the availability of the MEC application is guaranteed (e.g., a network failure, etc.), and/or another type of availability requirement for the MEC application. Elasticity requirements 440 may include an elasticity requirement for the MEC application, such as, for example, whether the MEC application is to be available continuously or deployed during particular time periods, a duration of deployment for the MEC application, and/or another type of elasticity requirement for the MEC application.

Bandwidth requirements 445 may store a bandwidth and/or throughput requirement for the MEC application. Application type requirements 450 may include an application type requirement for the MEC application, such as information identifying a particular application and/or a set of microservices to be deployed for the application, a classification for the application (e.g., a messaging application, a gaming application, a cloud computing application, etc.), and/or another application type requirement for the MEC application.

Each input into solution blueprint classification model 400 may be represented as an input vector of features and solution blueprint output 460 may correspond to an output vector representing a particular solution blueprint stored in blueprints DB 320. Thus, the solution blueprints stored in blueprints DB 320 may represent a set of output classes and solution blueprint classification model 400 may select a particular output class as the most likely output class corresponding to a set of inputs. The set of output classes may be updated at particular intervals (e.g., when an administrator adds a new solution blueprint to blueprints DB 320, etc.) and solution blueprint classification model 400 may be retrained or updated in response.

Furthermore, in some implementations, blueprint selector 360 may include additional machine learning models. For example, blueprint selector 360 may include a generative machine learning model that is trained to generate new solution blueprints using a generative adversarial network (e.g., wherein solution blueprint classification model 400 acts as the discriminative model). The generative machine learning model may generate a new solution blueprint for a particular combination of requirements and the generated solution blueprint may be added to blueprints DB 320 after an administrator approves the generated solution blueprint.

Although FIG. 4 shows exemplary inputs and outputs of solution blueprint classification model 400, in other implementations, solution blueprint classification model 400 may include fewer inputs, different inputs or outputs, additional inputs or outputs, or differently arranged inputs or outputs than depicted in FIG. 4.

Figure 5:
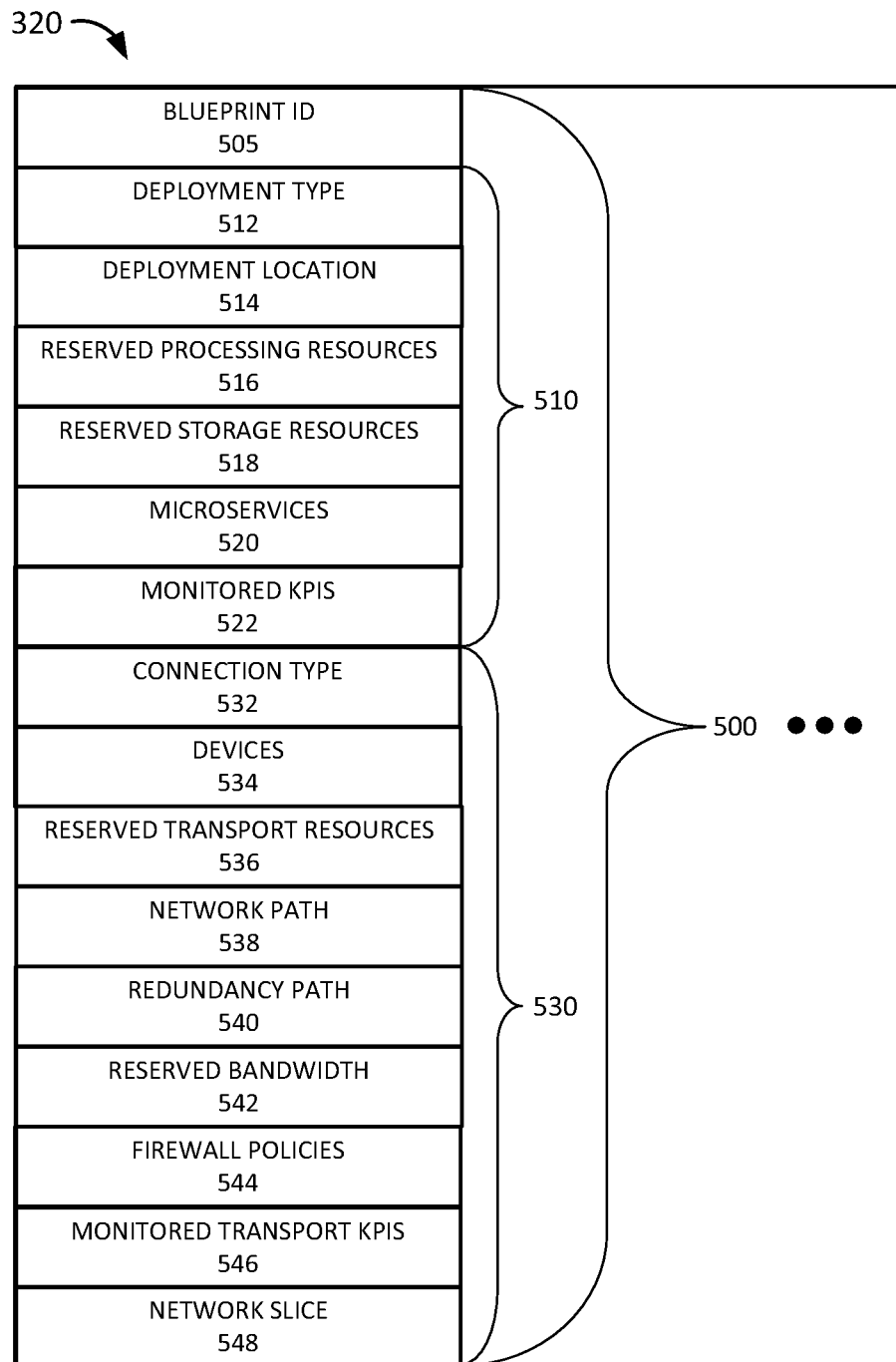
FIG. 5 is a diagram illustrating exemplary components of a blueprints database according to an implementation described herein.

FIG. 5 is a diagram illustrating exemplary information stored in blueprints DB 320. As shown in FIG. 5, blueprints DB 320 may include one or more blueprint records 500. Each blueprint record 500 may store information relating to a particular solution blueprint. Blueprint record 500 may include a blueprint identifier (ID) field 505, an application deployment blueprint 510, and a connectivity blueprint 530. Fields of application deployment blueprint 510 and/or connectivity blueprint 530 that specify particular locations, network devices, network paths, application or microservice image locations, etc. may be specified in the solution blueprint by the customer during the approval process and stored in deployment DB 365.

Blueprint ID field 505 may store an ID associated with a particular solution blueprint. Application deployment blueprint 510 may store the application deployment blueprint associated with the particular solution blueprint. Application deployment blueprint 510 may include a deployment type field 512, a deployment location field 514, a reserved processing resources field 516, a reserved storage resources field 518, a microservices field 520, and a monitored KPIs field 522.

Deployment type field 512 may include information identifying a deployment type, such as, for example, deployment in a virtual machine, deployment in containers, deployment using event driven serverless architecture, and/or another type of deployment. Deployment location field 514 may include information identifying a location for the deployment, such as, for example, a particular geographic location, a particular MEC network 140, a particular RAN 130, and/or another type of deployment location.

Reserved processing resources field 516 may store information identifying the processing resources that are to be reserved for the application deployment. Reserved storage resources field 518 may store information identifying memory and/or persistent storage resources that are to be reserved for the application deployment. Microservices field 520 may store information identifying a set of microservices that are to be deployed. For example, microservices field 520 may identify images of the microservices in an image registry from which the microservice instances are to be generated. If the application is not to be deployed as a set of microservices, but as a monolithic application, microservices field 520 may identify an image of the application in the image registry from which the application instance is to be deployed. Monitored KPIs field 522 may store information identifying one or more KPIs that are to be monitored for the application after deployment.

Connectivity blueprint 530 may store the connectivity blueprint associated with the particular solution blueprint. Connectivity blueprint 530 may include a connection type field 532, a devices field 534, a reserved transport resources field 536, a network path field 538, a redundancy path field 540, a reserved bandwidth field 542, a firewall policies field 544, a monitored transport KPIs field 546, and a network slice field 548.

Connection type field 532 may store information identifying a connection type from UE devices 110 to the deployment location of the MEC application, such as a cellular connection, a WiFi connection, a WiFi over cellular connection, a Layer 2 transport network connection, a Layer 3 transport network connection, and/or another type of connection. Devices field 534 may store information identifying transport network devices for the connection from UE devices 110 to the deployment location of the MEC application, such as, for example, network device 130 (e.g., a switch, router, firewall, gateway device, etc.), WiFi AP 114, and/or another type of device. Reserved transport resources field 536 may store information identifying reserved transport network resources, such as, for example, reserved processing and/or memory resources for the transport network devices for the connection from UE devices 110 to the deployment location of the MEC application.

Network path field 538 may store information identifying a primary network path for the connection from UE devices 110 to the deployment location of the MEC application. Redundancy path field 540 may store information identifying a redundancy network path for the connection from UE devices 110 to the deployment location of the MEC application. Reserved bandwidth field 542 may store information identifying the reserved bandwidth for the connection from UE devices 110 to the deployment location of the MEC application.

Firewall policies field 544 may specify a set of firewall policies that are to be applied to packets associated with the connection from UE devices 110 to the deployment location of the MEC application. Monitored transport KPIs field 546 may store information identifying one or more KPIs that are to be monitored for the connection from UE devices 110 to the deployment location of the MEC application. Network slice field 548 may store information identifying a network slice for the connection from UE devices 110 to the deployment location of the MEC application.

Although FIG. 5 shows exemplary components of blueprints DB 320, in other implementations, blueprints DB 320 may include fewer components, different components, additional components, or differently arranged components than depicted in FIG. 5.

Figure 6:
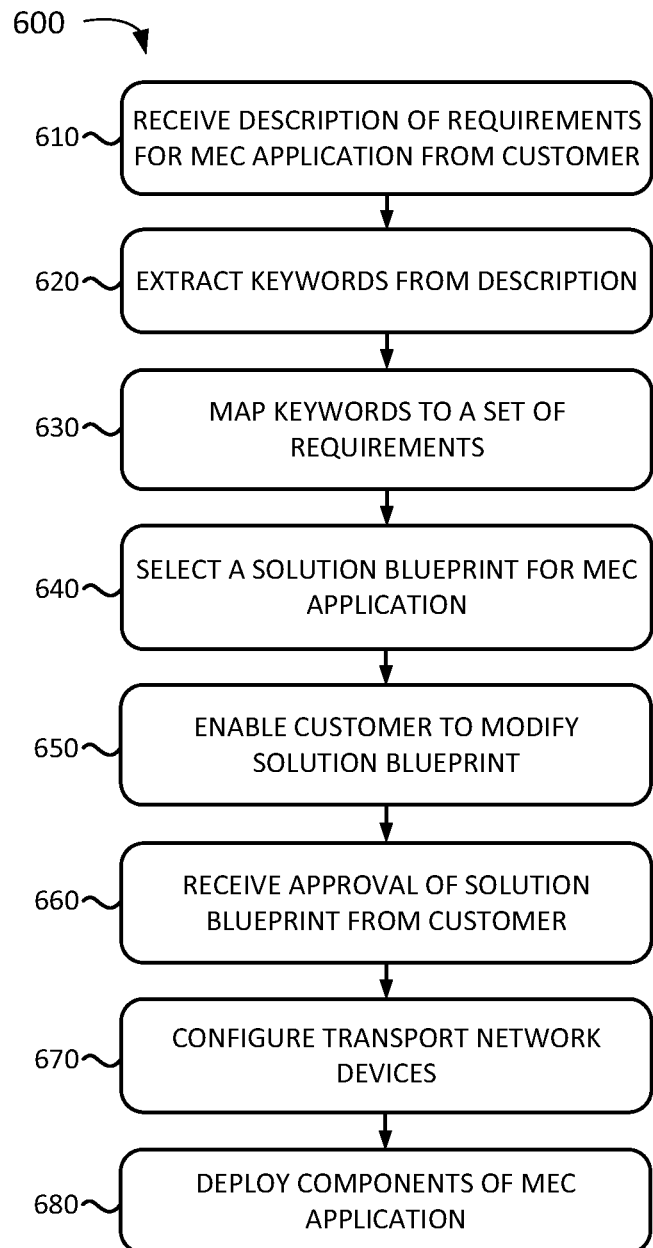
FIG. 6 illustrates a flowchart for selecting and deploying a solution blueprint according to an implementation described herein.

FIG. 6 illustrates a flowchart for selecting and deploying a solution blueprint according to an implementation described herein. In some implementations, process 600 of FIG. 6 may be performed by orchestration system 170. In other implementations, some or all of process 600 may be performed by another device or a group of devices separate from orchestration system 170.

As shown in FIG. 6, process 600 may include receiving a description of requirements for a MEC application from a customer (block 610), extracting keywords from the received description (bock 620), and mapping the extracted keywords to a set of requirements (block 630). For example, ordering system 160 may provide a document that includes a description of requirements for a MEC application to be deployed to orchestration system 170. Orchestration system 170 may perform keyword extraction on the received description to identify a set of keywords and map the set of keywords to a set of requirements. The set of requirements may be represented as a set of input vectors for solution blueprint classification model 400.

Process 600 may further include selecting a solution blueprint based on the set of requirements (block 640), enabling the customer to modify the solution blueprint (block 650), and receiving approval of the solution blueprint from the customer (block 660). For example, orchestration system 170 may use solution blueprint classification model 400 to select a solution blueprint from blueprints DB 320. Orchestration system 170 may provide the selected blueprint to the customer via ordering system 160 and the customer may make one or more modifications to the selected blueprint. For example, the customer may specify one or more deployment locations, add additional deployment locations, change the amount of reserved resources or reserved bandwidth for the deployment, specify a desired network path, request a redundancy path, add, remove, or modify a firewall rule, specify image locations for a set of microservices, and/or otherwise modify the solution blueprint before approval. Once the customer approves a solution blueprint, the solution blueprint may be stored in deployment DB 365.

Process 600 may further include configuring transport network devices based on the solution blueprint (block 670) and deploying components of the MEC application based on the solution blueprint (block 680). For example, orchestration system 170 may instruct deployment system 180 to deploy the MEC application based on the approved solution blueprint. Furthermore, orchestration system 170 may configure transport network devices for the connection between UE devices 110, which are to use the deployed MEC application, and the deployed location of the MEC application.

Figure 7:
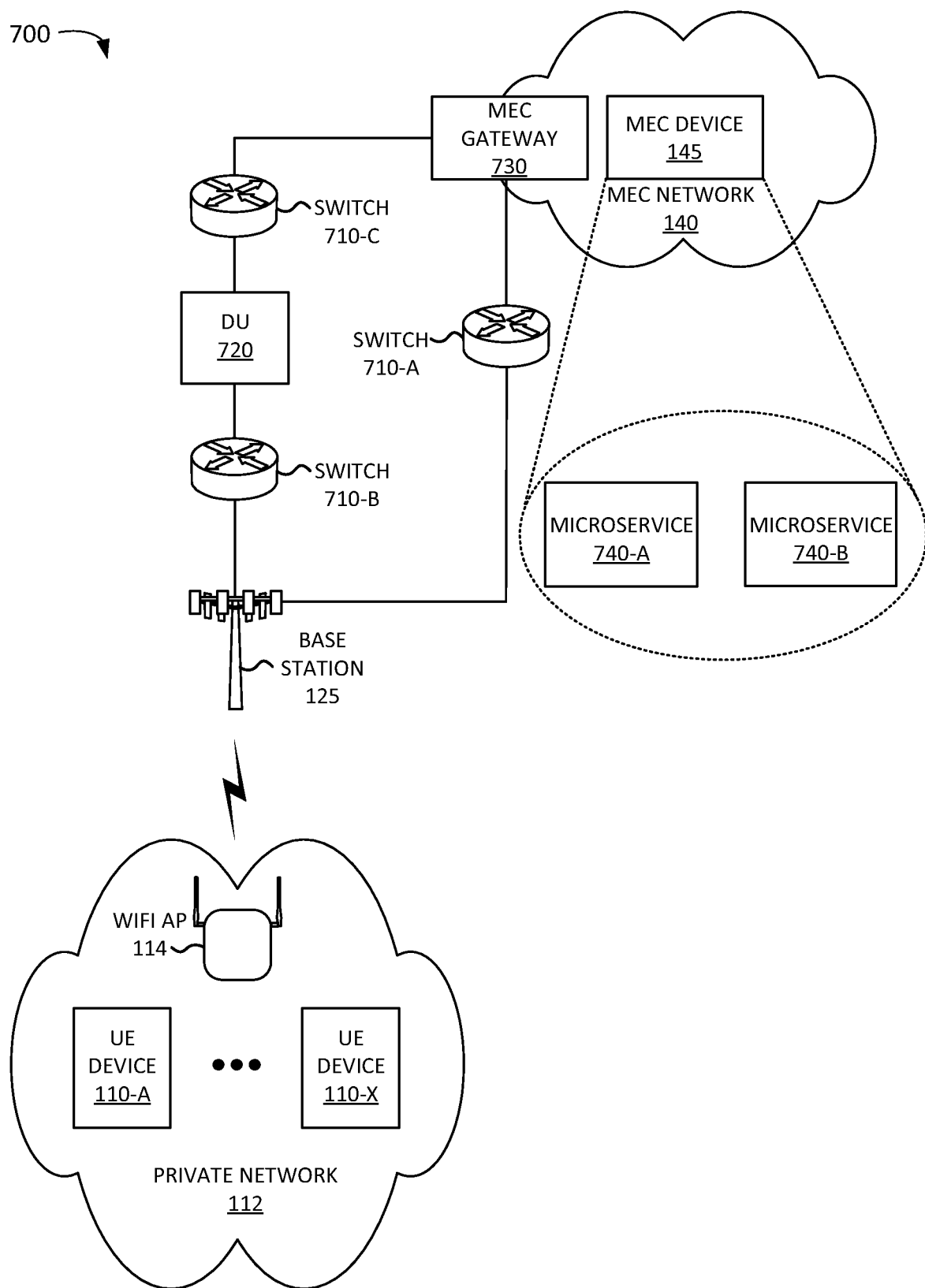
FIG. 7 is a diagram of an exemplary deployment according to an implementation described herein.

FIG. 7 is a diagram of an exemplary deployment 700 according to an implementation described herein. Assume a customer that owns a fabrication plant seeks to deploy a low latency MTC messaging application for UE devices 110-A to 110-X in private network 112 in the fabrication plant that maintains a record of all messages sent or received by the MTC devices. Orchestration system 170 may select a solution blueprint with a container based deployment with a connection from private network 112 to MEC network 140.

As shown in FIG. 7, deployment 700 may include a MEC application that is deployed as a microservice 740-A (e.g., a messaging microservice) and microservice 740-B (e.g., a message storing microservice) in MEC device 145. Furthermore, deployment 700 may include configuration of WiFi AP 114, switch 710-A, and MEC gateway 730 to route messages from UE devices 110-A to 10-X to MEC device 145 and implement firewall rules to prevent other UE devices from being able to access microservice 740-A. Additionally, deployment 700 may include configuration of a redundancy path in case the path that includes switch 710-A fails. The redundancy path may include configuring switch 710-B, DU 720, and switch 710-C to route messages from UE devices 110-A to 10-X to MEC device 145 and implement firewall rules to prevent other UE devices from being able to access microservice 740-A.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 6, the order of the blocks may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    determining, by a device, a plurality of requirements for a Multi-Access Edge Computing (MEC) application;
    selecting, by the device, a solution blueprint for the MEC application based on the determined plurality of requirements;
    configuring, by the device, at least one transport network device based on the solution blueprint; and
    deploying, by the device, at least one component of the MEC application on a MEC device in a MEC network based on the solution blueprint, wherein the MEC device is reachable from a base station via the at least one transport network device.

2. The method of claim 1, wherein determining the plurality of requirements for the MEC application includes:
    receiving a document describing the plurality of requirements for the MEC application;
    performing keyword extraction on the received document to identify a set of keywords; and
    mapping the set of keywords to the plurality of requirements.

3. The method of claim 2, wherein mapping the set of keywords to the plurality of requirements includes:
    using a machine learning model to map the set of keywords to the plurality of requirements.

4. The method of claim 1, wherein determining the plurality of requirements for the MEC application includes:
    detecting that a particular requirement, of the plurality of requirements, is not specified for the MEC application requested by a customer; and
    selecting a default value for the particular requirement, in response to detecting that the particular requirement is not specified for the MEC application requested by the customer.

5. The method of claim 1, wherein the plurality of requirements includes at least one of:
    a performance requirement associated with the MEC application,
    a capacity requirement associated with the MEC application,
    a location associated with the MEC application,
    a user type associated with the MEC application,
    a security requirement associated with the MEC application,
    an availability requirement associated with the MEC application,
    an elasticity requirement associated with the MEC application,
    a bandwidth requirement associated with the MEC application, or
    an application type associated with the MEC application.

6. The method of claim 1, wherein the solution blueprint includes at least one of:
    a connection type for a connection to access the MEC application,
    a transport network device for the connection,
    reserved processing resources of a transport network device associated with the connection,
    a network path for the connection,
    a redundancy path for the connection,
    a reserved bandwidth for the connection,
    a firewall rule associated with the connection, key performance indicators (KPIs) measured for the connection, or a network slice associated with the connection.

7. The method of claim 1, wherein the solution blueprint includes at least one of:

a network function deployment type associated with the MEC application, processing resources associated with the MEC application, storage resources associated with the MEC application, a set of microservices associated with the MEC application, or key performance indicators (KPIs) measured for the MEC application.

8. The method of claim 1, further comprising:

providing the selected solution blueprint to a user device;

receiving, from the user device, a modification of the selected solution blueprint; and modifying the selected solution blueprint based on the received modification.

9. The method of claim 1, wherein selecting the solution blueprint for the MEC application includes:

using a machine learning model to select the solution blueprint, from a set of solution blueprints, based on the determined plurality of requirements.

10. The method of claim 1, wherein selecting the solution blueprint for the MEC application includes:

using a generative machine learning model to generate the solution blueprint based on the determined plurality of requirements.

11. A device comprising:

a processor configured to:

determine a plurality of requirements for a Multi-Access Edge Computing (MEC) application;

select a solution blueprint for the MEC application based on the determined plurality of requirements;

configure at least one transport network device based on the solution blueprint; and deploy at least one component of the MEC application on a MEC device in a MEC network based on the solution blueprint, wherein the MEC device is reachable from a base station via the at least one transport network device.

12. The device of claim 11, wherein, when determining the plurality of requirements for the MEC application, the processor is further configured to:

receive a document describing the plurality of requirements for the MEC application;

perform keyword extraction on the received document to identify a set of keywords; and map the set of keywords to the plurality of requirements.

13. The device of claim 12, wherein, when mapping the set of keywords to the plurality of requirements, the processor is further configured to:

use a machine learning model to map the set of keywords to the plurality of requirements.

14. The device of claim 11, wherein, when determining the plurality of requirements for the MEC application, the processor is further configured to:

detect that a particular requirement, of the plurality of requirements, is not specified for the MEC application requested by a customer; and select a default value for the particular requirement, in response to detecting that the particular requirement is not specified for the MEC application requested by the customer.

15. The device of claim 11, wherein the plurality of requirements includes at least one of:

a performance requirement associated with the MEC application, a capacity requirement associated with the MEC application, a location associated with the MEC application, a user type associated with the MEC application, a security requirement associated with the MEC application, an availability requirement associated with the MEC application, an elasticity requirement associated with the MEC application, a bandwidth requirement associated with the MEC application, or an application type associated with the MEC application.

16. The device of claim 11, wherein the solution blueprint includes at least one of:

a connection type for a connection to access the MEC application, a transport network device for the connection, reserved processing resources of a transport network device associated with the connection, a network path for the connection, a redundancy path for the connection, a reserved bandwidth for the connection, a firewall rule associated with the connection, key performance indicators (KPIs) measured for the connection, or a network slice associated with the connection.

17. The device of claim 11, wherein the solution blueprint includes at least one of:

a network function deployment type associated with the MEC application, processing resources associated with the MEC application, storage resources associated with the MEC application, a set of microservices associated with the MEC application, or key performance indicators (KPIs) measured for the MEC application.

18. The device of claim 11, wherein the processor is further configured to:

provide the selected solution blueprint to a user device;

receive, from the user device, a modification of the selected solution blueprint; and modify the selected solution blueprint based on the received modification.

19. The device of claim 11, wherein, when selecting the solution blueprint for the MEC application, the processor is further configured to:

use a first machine learning model to select the solution blueprint, from a set of solution blueprints, based on the determined plurality of requirements, or use a second machine learning model to generate the solution blueprint based on the determined plurality of requirements.

20. A system comprising:

a first device configured to:

determine a plurality of requirements for a Multi-Access Edge Computing (MEC) application;

select a solution blueprint for the MEC application based on the determined plurality of requirements; and a second device configured to:
  receive the selection solution blueprint from the first device;
  configure at least one transport network device based on the solution blueprint; and
  deploy at least one component of the MEC application on a MEC device in a MEC network based on the solution blueprint, wherein the MEC device is reachable from a base station via the at least one transport network device.

* * * * *